Nov. 8, 1966  C. R. RICE  3,283,682
CAMERA APPARATUS

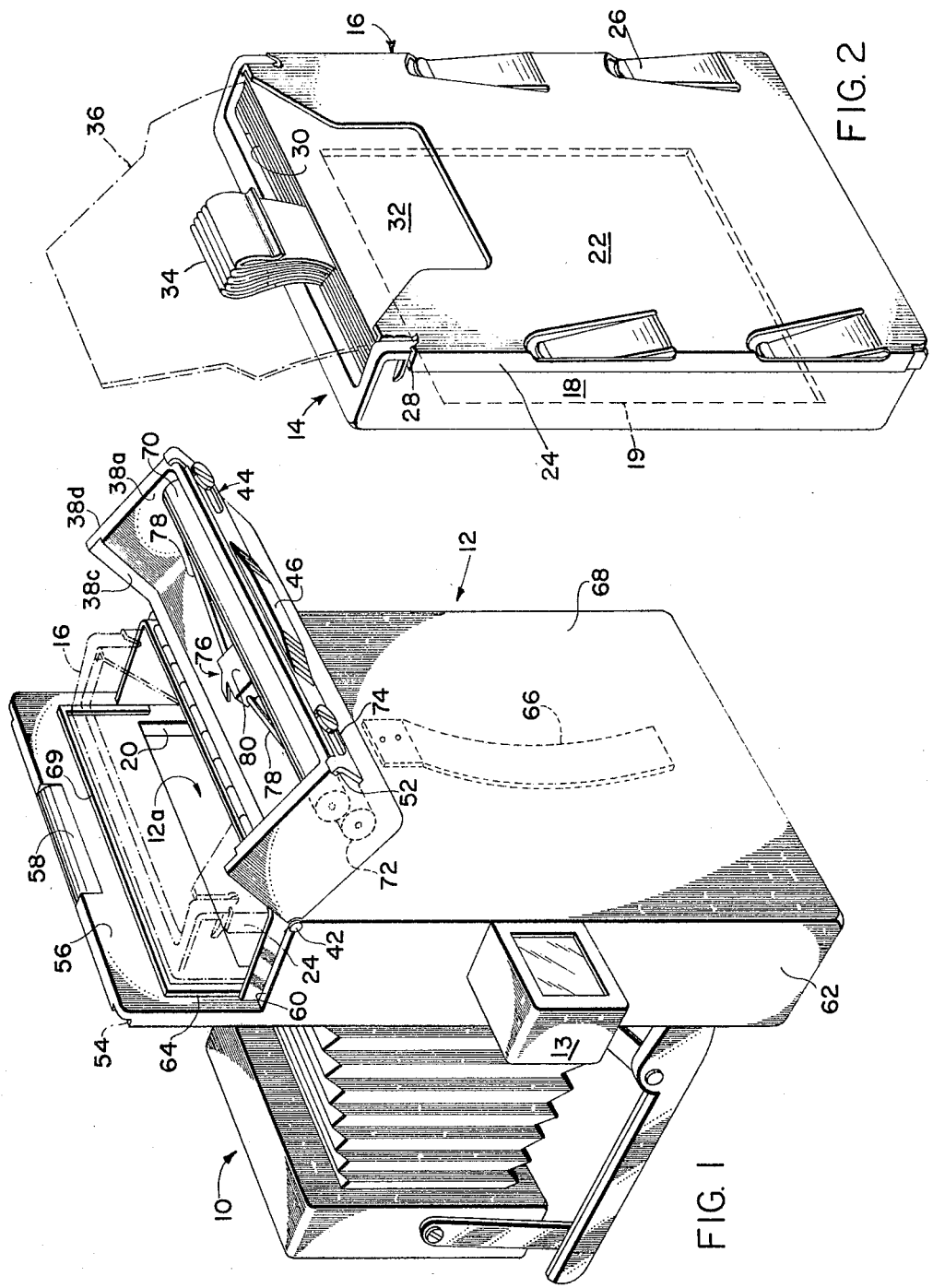

Filed July 22, 1964  2 Sheets-Sheet 2

INVENTOR.
Christopher R. Rice
BY
Brown and Mikulka
ATTORNEYS 3,283,682
CAMERA APPARATUS
Christopher R. Rice, Wakefield, Mass., assignor to Polaroid Corporation, Cambridge, Mass., a corporation of Delaware
Filed July 22, 1964, Ser. No. 384,310
7 Claims. (Cl. 95—13)

This invention relates to a novel combined film-pack mounting exposure and processing chamber or magazine device suitable for incorporation with a camera, the device including an end-opening cover for more readily loading a film pack thereinto and positioning it for the photographic exposure of each film assembly thereof, as well as for enabling the easy removal of an exhausted film-pack container. The cover means of the device also constitutes a novel supporting element for a film-assembly processing mechanism.

A camera and film pack of a general type related to the film-pack mounting and processing device of the present invention are described in the copending U.S. Patent 3,080,805. The film-processing mechanism, in conjunction with suitable self-contained processing means of each film assembly of the film-pack including a releasably-contained processing liquid, is adapted to produce sequentially, through a diffusion transfer method, finished photographic prints, either in black-and-white or in full color. The processing of each film assembly, immediately following its photographic exposure, is initiated by the aforesaid film-processing mechanism and is completed a few seconds thereafter while the film assembly is completely withdrawn from the magazine.

In accordance with the foregoing considerations, objects of the invention are to provide, as an integral component of a camera, a lighttight enclosing means or magazine comprising novel means for mounting a film-pack and means for supplying, exposing and processing individual film assemblies thereof; and to provide chamber or magazine means of the character described wherein is included improved access means in the form of an end-opening cover enabling a more rapid and convenient loading and positioning of the film pack or, after the last film assembly has been exposed and processed, removal of the empty film-pack container.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of the film-pack mounting and processing chamber or magazine of the invention in the form of an element of a camera, namely, the camera back;

FIG. 2 is a diagrammatic perspective view of a film pack adapted to be mounted within the magazine or chamber of FIGURE 1;

Figure 3:
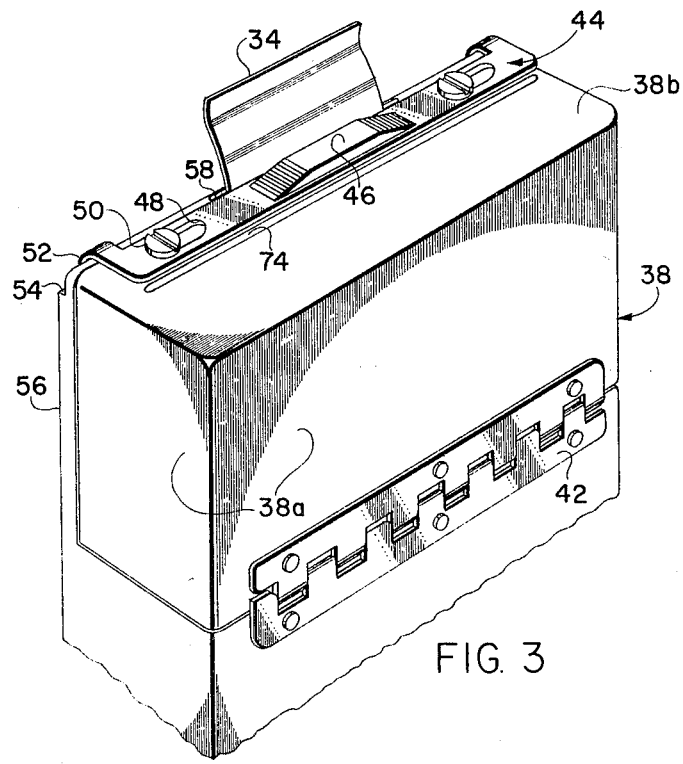
FIG. 3 is a fragmentary diagrammatic perspective view of the magazine of FIGURE 1.
Figure 4:
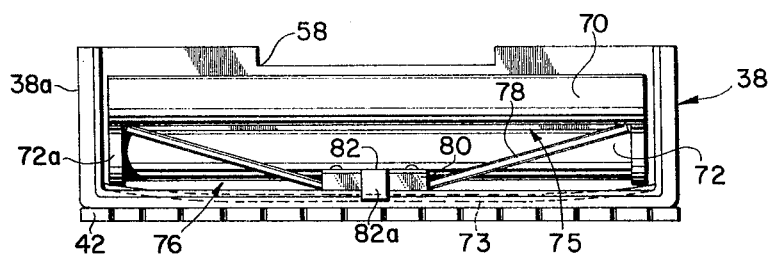
FIG. 4 is a diagrammatic front view of the magazine cover and elements mounted therewithin.

Referring now to FIGURE 1, a fragmentary portion of a camera 10 is shown, the magazine device 12 of the invention forming an integral part thereof, namely, constituting the camera back and serving to mount such optical elements as may suitably be located thereat, as exemplified by the viewfinder 13. A film-pack 14, of a type described in the aforementioned U.S. Patent No. 3,080,805 and illustrated in FIG. 2, is adapted to be mounted in the magazine. The film-pack 14 constitutes no part of the present invention and is illustrated to some degree herein to better explain the structure and function of elements of the magazine 12. The film-pack container component 16 is shown, in part, positioned in the interior or chamber 12a of the magazine, the visible container portions being represented in broken outline. It will be noted that the film-pack container extends well beyond or above the principal body portion of the magazine so that it may easily be grasped when the magazine is open.

The film-pack container 16 includes a principal section 18 composed, for example, of an opaque somewhat resilient plastic material having formed therein an exposure aperture 19 which is positionable toward the front of the camera adjacent to an exposure aperture 20 of the magazine, and a metallic section 22 comprising a pair of overlying marginal portions or flanges 24. The section 22 includes four inwardly inclined flat spring-like members 26 which bear against an inner web element, not shown, of the container. The flanges 24 engage a pair of longitudinally extending ribs 28 of the plastic section 18, thereby holding the two container sections firmly together. A plurality of film units or assemblies 30 are mounted in, and supplied from the container 16. Each film assembly 30 includes a photosensitive element, facing the aperture 19 and not visible in the illustration, an image-receiving element in the form of a specially surfaced sheet material 32, and an enclosed compressively-releasable processing liquid located in a capsule or pod between the photosensitive and image-receiving elements, as well as a draw-tab 34 and a leader, shown in dashed outline at 36. The draw-tab and leader are employed, respectively, to bring an exposed photosensitive element and an image receiving element to superimposed relation and, thereafter, to advance both, together, and subject the entire film assembly to a compressive force to release and spread a processing liquid therewithin as the assembly is withdrawn from the magazine.

Further referring to the magazine 12, and employing the terms "front" and "rear," as elsewhere herein, in the sense of proximity to or remoteness from the front of the camera, a cover or capping element 38, which includes enclosing side and top wall members 38a and 38b forming a recess having an open face, is pivotally mounted on the rear wall 68 by a hinge 42. The cover is shown at open position in FIGURE 1 and at closed position in FIG. 3. The cover is held at closed position by the latch 44. The latch is adapted to be moved laterally, by manually actuating the knob 46 thereof to the limits permitted by the slots 48 and fixed pins 50. When the latch is brought, slidably in a given direction, to its holding position, a pair of fingers 52 thereof assumes an overlying and engaging relation with a pair of lugs or flanges 54 located at the upper and laterally outermost extremities of the magazine front wall 56. Slidable movement of the latch 44 in an opposite direction permits the cover to be opened to the limit permitted by the hinge 42. The front wall 56 includes the tapered recess 58 which, when the cover is closed, provides an aperture through which extends the draw-tab 34, employed to initiate the processing of each film assembly 30.

When the cover 38 is at closed position, marginal portions 38c and 38d thereof cooperate with flange means 60 of the side walls 62 and a pair of ribs or moldings 64 of the front wall 56, these components constituting means to prevent the entry of unwanted light into the magazine chamber. When the film-pack 14 has been loaded in the magazine 12 through its open end, the flat spring 66, mounted on the rear wall 68 of the magazine, bases the film-pack toward the front wall 56 thus insuring that the photosensitive emulsion of the foremost film assembly at aperture 19 of the film pack is properly located at the focal plane, adjacent to the magazine aperture 20. It is to be noted that the front wall 56 is longer than the side and rear walls of the magazine thereby cooperating with the open face of the cover 38. The raised rib or molding 69 on the front wall 56 cooperates with the spring 66 to insure that the film pack is properly seated and held against movement in the magazine in a direction parallel to the long direction of the magazine. The flanges 24 of the film pack, bearing against the inner surface of the side walls 62 of the magazine firmly hold the film pack against sideways movement in the magazine. With the cover 38 closed, a draw-tab 34 attached to an opaque cover sheet, initially covering the film-pack aperture 19, first extends through the aperture 58. By pulling upon this draw-tab, the cover sheet is removed, the first film assembly is ready for exposure and a second draw-tab, attached to the film assembly, is automatically caused to protrude through the aperture 58, ready for use.

A pair of compressive means, exemplified by the pressure rolls 70 and 72, is mounted in the cap-like cover 38. The pressure rolls are suitably formed of metal such as stainless steel. They are spaced apart by a given amount, as determined by the peripheral flange means 72a, and one roll is biased toward the other, as by the flat spring 73. A slot-like aperture 74 formed in the cover 38 is aligned with the bite or spacing 75 between the pressure rolls. When the cover is closed and the tab 34 of a first film assembly is manually drawn upon to commence processing of the assembly, following its exposure, the exposed emulsion layer and the image-receiving element or layer 32 are first brought to a superimposed facing relation, as previously intimated. Thereafter, continued drawing upon the tab 34 advances the leader element 36 freely between the pressure rolls, as permitted by the spacing therebetween, and through the slot 74, at which stage of manual advancement the tab 34, being releasably attached, separates from the film assembly. This leaves the film assembly leader 36, alone, extending from the magazine for use in drawing the entire film assembly between the pressure rolls 70 and 72, through the slot 74, and from the magazine entirely to effect its processing, as previously described. A draw-tab 34 of the next film assembly is releasably attached to a portion of a preceding film assembly and is automatically caused to protrude through the aperture 58 by withdrawal of the preceding film assembly. Accordingly, the next-positioned draw-tab is in readiness to initiate repetition of the procedures, just described, relative to a succeeding film assembly. Unwanted light is prevented from passing through or from the apertures 58 and 74 to photosensitive areas of the film assemblies by reason of baffle means of the film pack, obstructing portions of the pressure rolls, and the presence of the tab or leader in the aperture.

During the processing operation, a secondary compression-applying device 76, comprising a pair of resilient wire-like arms 78 formed, for example, of phosphor bronze and pivotally mounted in a bearing block 80 is adapted to engage lateral marginal portions of each film assembly, adjacent to the bite of the pressure rolls and just prior to entrance of the film assembly therebetween. A plate-like element 82 comprising a projecting tab or tongue 82a extending, forwardly at an acute angle, serves in a restraining or "hold-back" capacity with respect to the image-receiving sheet 32 of the assembly during the above-described operations performed by manually drawing upon the tab 34, to prevent its prematurely passing between the pressure rolls. The film assembly, during its advancement as provided by drawing upon leader 36, rides, along its longitudinal marginal areas, upon the extremities or margin-engaging elements of the members 78. The function of the device 76 is to bear against the aforesaid marginal portions of the film assembly to contribute to a laterally inward flow of the processing liquid and to facilitate an even and complete spreading thereof. The moderate resistance of the film assembly to withdrawal from the magazine, such as may be due to frictional contact of film assembly and container surfaces, causes a certain degree of tensioning of the film assembly during the processing stage of advancement. This provides a slight flexing of the resilient arms 78 toward the spacing 75 between the pressure rolls.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with a camera for, respectively, supplying, mounting for photographic exposure, and processing a plurality of film assemblies of a film pack, which film assemblies embody self-contained liquid-processing means, said apparatus comprising means forming a rectangular chamber adapted to mount said film pack therewithin including an exposure aperture formed in a forward wall thereof and having a substantially complete opening at one end, cover means movably attached to said chamber means adjacent to said end for permitting introduction and withdrawal of said film pack relative to said chamber means when at open position and for rendering said chamber means light-tight and adapted to exposure and processing of said film assemblies when at closed position, and means for processing said film assemblies including a first pair of predetermined spaced compression-applying members mounted within said cover means for bearing upon and activating said liquid-processing means to process said film assemblies, a pair of cooperating slot-like aperture means formed in part in said cover means for selectively advancing portions of said film assemblies, for drawing said film assemblies between said compression-applying members, and for withdrawing said film assemblies from said camera apparatus, and a second pair of compression-applying members adapted to bear against longitudinal marginal areas of each of said film assemblies immediately prior to its advancement between said first pair of compression-applying members, said second pair of compression-applying members comprising resilient margin-engaging elements which are laterally spaced apart by a distance slightly less than the width of each film assembly and are adapted to be flexed, through tensioning of said film assembly during its advancement, so as to lie in a plane substantially parallel with and at least adjacent to the plane of a film assembly passing between said first pair of compression-applying members.

2. Photographic apparatus, as defined in claim 1, wherein said chamber means comprises an extended forward wall portion.

3. Photographic apparatus, as defined in claim 1, wherein said margin-engaging elements of said second pair of compression-applying members are adapted to be moved toward the spacing between said first pair of compression-applying members through tensioning of said film assembly and frictional engagement of said elements with said longitudinal marginal areas during advancement of said film assembly.

4. Photographic apparatus, as defined in claim 1, wherein said second pair of compression-applying members is in the form of a pair of resilient arms extending laterally angularly from a central mounting block.

5. Photographic apparatus, as defined in claim 4, wherein said arms are appendages of a unitary element.

6. Photographic apparatus, as defined in claim 5, wherein said second pair of compression-applying members is pivotally mounted in said central mounting block.

7. Photographic apparatus, as defined in claim 6, wherein said second pair of compression-applying members is composed of a resilient wire material.

References Cited by the Examiner

UNITED STATES PATENTS

| | | | |
|---|---|---|---|
| 2,497,816 | 2/1950 | Greenhalgh | 95—22 |
| 3,139,019 | 6/1964 | Eloranta | 95—89 |

JOHN M. HORAN, *Primary Examiner.*